Jan. 17, 1956    J. W. MORRELL ET AL    2,730,758
METHOD AND APPARATUS FOR THE PRODUCTION
OF CRIMPED FILAMENTS
Filed July 21, 1954
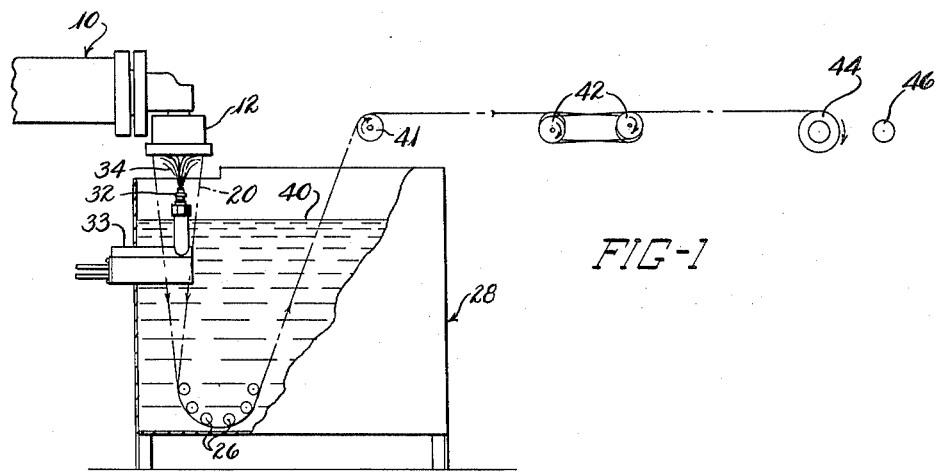
FIG-1
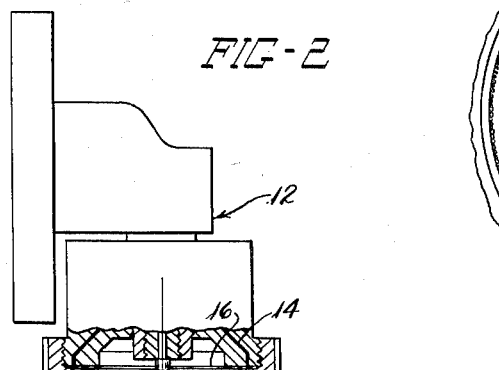
FIG-2
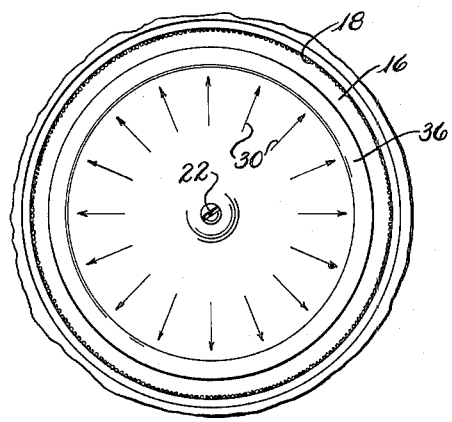
FIG-3
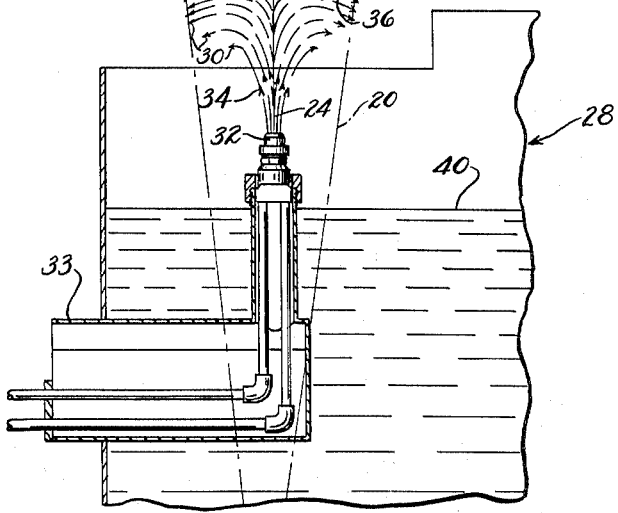
INVENTORS
JOHN W. MORRELL
WALTER J. SMITH
BY
W. A. Fraser
ATTY.

United States Patent Office 2,730,758
Patented Jan. 17, 1956

2,730,758

METHOD AND APPARATUS FOR THE PRODUCTION OF CRIMPED FILAMENTS

John W. Morrell, Pottstown, and Walter J. Smith, Royersford, Pa., assignors to The Firestone Tire & Rubber Company, Akron, Ohio, a corporation of Ohio Application July 21, 1954, Serial No. 444,732

6 Claims. (Cl. 18—8)

This invention relates to the production of fine, crimped filaments of crystalline resins, and to a novel apparatus for said production.

Vinylidene chloride, nylon, polyethylene, dichlorobutadiene and other crystalline high polymeric resins may be extruded as fine filaments and, after cooling, stretched to several times their original lengths to convert them into an oriented-crystalline form in which the high polymeric molecule chains are aligned generally parallel to the length of the filament, and are associated with neighboring polymeric chains in crystalline aggregates, which aggregates are likewise aligned in a direction parallel to the length of the filament. In this form, the filaments are characterized by excellent strength and elasticity, recommending them for a wide variety of textile applications. In would be highly desirable if, in addition to these excellent properties, a certain degree of curliness or crimp, such as is characteristic of wool and other natural fibers, could be imparted to this filament. A number of proposals have been made to this end; for instance, it has been proposed to blow air and/or water from all sides upon the freshly extruded filaments. The crimp so produced is irregular, and often is not sufficiently fine and pronounced to produce the desirable "loft" of wool or like fibers.

Accordingly, it is an object of this invention to provide a novel and improved method for the manufacture of crimped filaments of crystalline high polymeric resins.

Another object is to provide such a process in which the filaments produced will have a shorter, tighter, and more regular crimp, and improved loft, in comparison with filaments of this type heretofore produced.

A further object is to provide such a process which may be carried out inexpensively and with a minimum of skilled attendance.

A still further object is to provide a novel apparatus for the carrying out of the process of the invention.

The invention will be described in connection with the accompanying drawings, wherein:

Fig. 1 is a general diagrammatic view of the apparatus employed in this invention;

Fig. 2 is a detailed side view of the extruding die and associated equipment employed in this invention, and Fig. 3 is a sectional view, along the line 3—3 of Fig. 2.

SYNOPSIS OF THE INVENTION

The above and other objects are secured in a process in which a crystalline polymeric resin is continuously melt extruded through a die in which the filament extruding orifices are arranged in a circle, so that the emerging filaments form a substantially cylindrical array with the filaments forming elements of the cylinder, which cylinder has a vertical axis and is coaxial with said circle of orifices. A flow of cooling gas is directed radially outwardly in all directions from the axis of said cylindrical array past said filaments, and the filaments are thereafter passed into a liquid quenching bath at a level below the level of said flow of cooling gas, whereby to quench the filaments from the semi-molten state. The quenched filaments are subjected to tension to convert them to the oriented crystalline state, and the tension is then released and the filaments allowed to relax. During this relaxation period, the filaments will retract slightly and become crimped and curly.

THE CRYSTALLINE RESINS

The resins employed in the extrusion of curly filaments in accordance with this invention are of the special class known as "crystalline" resins. These resins are fusible to form very fluid melts. In the solid state, the long molecular chains of these resins tend to associate together locally to produce crystalline regions. If these resins are formed into filaments, as for instance by extrusion in the heat-softened state, and the filaments are thereafter subjected to stretching, these crystalline aggregates become aligned lengthwise in the direction of stretching and impart a high degree of strength and flexibility to the resultant filaments. Resins of this type are well known, and include for instance the vinylidene chloride resins, which are polymers of vinylidene chloride and copolymers thereof with up to 20% of other unsaturated compounds copolymerizable therewith, such for example, as vinyl chloride, vinyl fluoride, vinyl acetate, styrene, esters of acrylic and methacrylic acids such as methyl methacrylate, and ethyl methacrylate, acrylonitrile, vinyl type ethers and ketones such as methyl vinyl ether, methyl vinyl ketone and related compounds such as methyl isopropenyl ketone and the like. For a more complete list of compounds known to copolymerize with vinylidene chloride to produce crystalline resins which can be processed as described herein see Krczil: "Kurzes Handbuch Der Polymerisation Technik," vol. II, "Mehrstoff Polymerization," Edwards Bros. Inc., Page 739, the items indented under "Vinyliden Chlorid." These vinylidene chloride resins are particularly adapted for use in this invention, and outstanding results have been obtained therewith. However, the invention is also applicable to the processing into curly crimped filaments of other crystalline resins, such for instance as the nylon resins, which are high molecular weight condensation products of dicarboxylic acids with diamines or of amino acids alone or of mixtures of amino acids with dicarboxylic acids and diamines; aromatic polyester resins such as "Terylene" or "Dacron" which are condensation products of terephthalic acid and ethylene glycol; polyethylene; and polymers of 2,3-dichlorobutadiene-1,3 such as described in the patent to Kuhn 2,451,195. All of these resins may be processed in accordance with this invention into crimped fibers having excellent curliness, loft and feel.

THE EXTRUSION AND AIR COOLING AND APPARATUS THEREFOR

The art of melt extruding crystalline resinous filaments is well known and, up to the point at which the molten filaments are extruded from the die orifices, the process of this invention follows this prior art and makes use of conventional melting and extruding machinery. However, the extruding dies employed in this invention have the orifices thereof arranged in a circle in a horizontal plane with the orifices opening downwardly, normal to the plane of said circle. The emerging filaments are conducted vertically downwardly from said orifices, so that they form a substantially cylindrical array—i. e., at the orifice the filaments are all parallel to each other and equidistant from and parallel to an axis drawn concentric with the circle upon which the orifices of the die are disposed. This is best seen in the drawings, which show a conventional screw type extruding machine 10 which takes raw granular resin, melts it and forces it into an extruding head 12. As shown in Fig. 2, this extruding head comprises a conical distributing passage 14 into which the molten resin is forced by the extruding machine 10, which receiving passage leads downward to the periphery of a die 16. The face of this die 16 is disposed in a horizontal plane and is provided with a large number of die orifices 18 communicating with the conical passage 14 from which they receive the molten resin under pressure and extrude it as filaments 20. These orifices are arranged in a circle having its center at the center 22 of the die 16, and it will be seen that the filaments 20 are extruded downwardly in a substantially vertical direction equidistant from an axis 24 drawn through the center 22 and perpendicular to the face of the die 16.

It will be understood that the description of the filaments 20 as being in a "cylindrical" array, is approximate only: they will be deflected outwardly by cooling air as described below. Countervailing this, the filaments will usually also be drawn inwardly into a frusto-conical array, since they are gathered together in passing over the guides 26 in the quenching bath 28. For all practical purposes, however, the array of filaments may be designated "cylindrical."

Means are provided for directing a flow of cooling air or other gas radially in all directions away from the axis of the cylindrical array of extruded filaments and outwardly past the extruded filaments. This flow of cooling air is indicated by the arrows 30. As shown, this means comprises an air jet 32 mounted upon a bracket arm 33 attached to the wall of a quenching tank into which the filaments ultimately fall. This air jet is directed upwardly and concentrically of the cylindrical array of filaments so as to project a stream of air (indicated by the arrows 34) against a discoidal deflector plate 36 which is suspended from the extrusion die 16 in a position immediately below the die and coaxial of the cylindrical array of filaments. The air from the jet impinging upon this deflector plate is deflected radially outwardly and away from the axis 24 of the cylindrical array of filaments in all directions past the freshly extruded filaments 20. This air flow effects two purposes; first it rapidly chills the skin surface of the filaments and does so in a non-uniform manner, the greatest cooling effect being on that side of any given filament facing the axis of the cylindrical array of filaments thereby setting up uneven strains in the filaments; likewise, the flow of air appears to induce vibrations in the freshly extruded filaments, setting up varying strains in the filaments distributed periodically lengthwise of the filaments.

The filaments after passing the outwardly-directed flow 30 of cooling air, drop into a tank 28 of cooling water 40. The filaments thereby become chilled and completely solidified, whereby the strains induced as above discussed become preserved therein. The filaments then pass down through the bath under a set of guide pins 26 and thence upward through and out of the bath to and over a guide roll 41 to a pair of drawing rolls 42. The drawing rolls are driven at a peripheral speed in excess of the linear velocity at which the filaments are extruded; due to the resistance of the water 40 and to some extent the friction of the pins 26, a considerable tension is induced in the filaments and they are stretched to several times their extruded length during their passage through the bath and to the drawing rolls, whereby the filaments are drawn into an oriented crystalline form. The filaments pass from the drawing rolls 42 to a wind-up drum 44 upon which they are wound until a conveniently large skein of filaments has accumulated thereon, whereupon the filament is cut and transferred to a second wind-up roll 46 and the accumulated filament stripped off of the first wind-up roll 44 and hung up in a loose hank to relax as hereinafter described. When the second wind-up roll 46 has accumulated a sufficiently large skein of filament, the filament is again cut, transferred to the first wind-up roll 44, and the accumulated filament stripped from the second wind-up roll 46 and hung up to relax, and so on, the wind-up of the filament being alternated between the first and second wind-up rolls 44 and 46.

The filaments when first removed from the wind-up rolls have substantial curliness which increases after the filaments have been permitted to relax and dry out. They have preserved in them the non-uniform strains set up by the action of the air flow to which they were subjected between the extruder and the quenching bath. Upon being removed from the wind-up rolls and hung up in a relaxed condition, the skeins of filament contract and, due to the aforesaid uneven strains, they do so with the formation of kinks and curls which are quite regular and are quite sharp and close—more uniformly so than has been possible with any other known methods of inducing curl and crimp in crystalline polymeric filaments.

With the foregoing general discussion in mind, there is given herewith a specific example of a mode of operation of the process of this invention. All parts given are by weight.

*Example*

| | Parts |
|---|---|
| Vinylidene chloride resin (A copolymer of 85% vinylidene chloride, 15% vinyl chloride) | 92 |
| Tertiary-butyl phenyl salicylate | 5 |
| Phenoxy propene oxide | 2 |

The above ingredients were blended well together and extruded in the apparatus of Figs. 1 to 3. Specifications and dimensions of the equipment, and operating conditions were as follows:

Extruding machine 10—
    Make: National Rubber Machinery Co.
    Size: 2 inch
    Revolutions per minute of screw: 30–45 R. P. M.
    Temperature of barrel: 190° C.
    Temperautre of extruding head: 170° C.
Extruding die 16—
    Number of orifices 18: 250
    Diameter of orifices 18: 0.0125 inch
    Diameter of circle upon which the orifices are arranged: 6 inches
    Temperature of die 16: 170° C.
    Through-put of resin through each die orifice .0012 lb. per min.
    Theoretical speed of filament extruded through orifice (assuming no contraction of diameter of filament): 132 ft. per min.
Flow of cooling air—
    Diameter of air jet orifice: ⅜ inch
    Volume of air to jet: 125 cubic ft. free air per min.
    Distance from nozzle tip to deflector plate: ⅝ inch
    Approximate velocity of air flow outward past the filament at a point ¾ inch below die: 16 ft. per sec.
Quenching, orientation and take-off—
    Temperature of water quenching bath 40: 15° C.
    Distance of surface of quenching bath 40 below the die: 4 inches
    Length of filament immersed in bath 40: 6 ft.
    Peripheral speed of drawing rolls 42: 675 ft. per min.
Relaxation—
    Length of time skeins are permitted to relax after removal from wind-up rolls 44 and 46: 1 to 24 hours
    Temperature at which skeins are relaxed: 25° C.
Properties of the curly filament—
    Diameter of individual filament: .0018 inch
    Tensile strength: 26,100 pounds per square inch
    Kinks in filament per inch of length of filament: 8
    Approximate height of kinks from one extreme to other: .125 inch
    Elongation at break: 13%

The filaments produced as above described had excellent feel, handle and loft comparable to naturally kinked fibers such as wool, alpaca and the like. The filaments were spun into yarn which was woven as the pile of an Axminster carpet, and in this application exhibited a very desirable loft and showed good resistance to ordinary wear. The filaments were likewise found highly suitable when spun into yarns for knitting into garments, and for ordinary woven fabric.

From the foregoing general discussion and detailed description of the operation of the invention, it will be evident that this invention provides a novel process and apparatus for the production of curly, kinked fine filaments of oriented crystalline resins. The process can be carried out with a minimum of skilled attendance and the apparatus required is both simple and inexpensive. The filaments produced have much more closely spaced, and sharper, crimps than have heretofore been continuously possible, and are characterized by excellent feel, loft, hand, and other desirable textile properties.

What is claimed is:

1. Process for producing crimped filaments of crystalline polymeric resins which comprises continuously melt-extruding a plurality of filaments of said resin in a vertical downward direction in a substantially cylindrical array with the filaments forming elements of the cylinder, continuously directing a flow of cooling gas radially outwardly in all directions from the axis of said cylindrical array past said filaments, passing said filaments into a liquid quenching bath at a level below the level of said flow of cooling gas, removing said filaments from said quenching bath, subjecting the filaments to tension to orient the same to the oriented-crystalline state, and releasing the tension to permit the filaments to retract into a crimped, curly configuration.

2. Process for producing crimped filaments of vinylidene chloride resins which comprises continuously melt-extruding a plurality of filaments of said resin in a vertical downward direction in a substantially cylindrical array with the filaments forming elements of the cylinder, continuously directing a flow of cooling air radially outwardly in all directions from the axis of said cylindrical array past said filaments, passing said filaments into an aqueous quenching bath at a level below the level of said flow of cooling air, removing said filaments from said quenching bath, subjecting the filaments to tension to orient the same to the oriented-crystalline state, and releasing the tension to permit the filaments to retract into a crimped, curly configuration.

3. Process for producing crimped filaments of crystalline polymeric resins which comprises continuously melt-extruding a plurality of filaments of said resin in a vertical downward direction in a substantially cylindrical array with the filaments forming elements of the cylinder, continuously directing a stream of cooling air upwardly and axially of the cylindrical array against a discoidal deflector disposed coaxially of said cylindrical array so as to deflect said stream as a radial flow of cooling air outward in all directions from the axis of said cylindrical array, past said filaments, passing said filaments into an aqueous quenching bath at a level below said radial flow of cooling air, removing said filaments from said quenching bath, subjecting the filaments to tension to orient the same to the oriented-crystalline state, and releasing the tension to permit the filaments to retract into a crimped, curly configuration.

4. Process for producing crimped filaments of vinylidene chloride resins which comprises continuously melt-extruding a plurality of filaments of said resin in a vertical downward direction in a substantially cylindrical array with the filaments forming elements of the cylinder, continuously directing a stream of cooling air upwardly and axially of the cylindrical array against a discoidal deflector disposed coaxially of said cylindrical array so as to deflect said stream as a radial flow of cooling air outward in all directions from the axis of said cylindrical array, past said filaments, passing said filaments into an aqueous quenching bath at a level below said radial flow of cooling air, removing said filaments from said quenching bath, subjecting the filaments to tension to orient the same to the oriented-crystalline state, and releasing the tension to permit the filaments to retract into a crimped, curly configuration.

5. An apparatus for the manufacture of crimped filaments from crystalline polymeric resins comprising a melt spinning head having a die provided with a plurality of spinning orifices arranged in a circle and directed vertically downwardly and means disposed below and coaxially of said circle for directing a radial flow of cooling gas outwardly in all directions from said axis and past the filements extruded from said orifices.

6. An apparatus for the manufacture of crimped filaments from crystalline polymeric resins comprising a melt spinning head having a die provided with a plurality of spinning orifices arranged in a circle and directed vertically downwardly, a jet for projecting cooling air disposed below and coaxial with said circle and arranged to direct a stream of cooling air upwardly and axially of said circle, and a discoidal deflector arranged coaxially of said circle and jet in the path of said stream of cooling air so as to deflect said stream into a radial flow of cooling air outward in all directions from the axis of said circle and past the filaments extruded from said orifices.

References Cited in the file of this patent

UNITED STATES PATENTS

| | | |
|---|---|---|
| 1,933,587 | Dreyfus | Nov. 7, 1933 |
| 2,252,689 | Bradshaw | Aug. 19, 1941 |
| 2,514,189 | Spencer | July 4, 1950 |
| 2,542,973 | Abernethy | Feb. 27, 1951 |